United States Patent [19]

Leempoel

[11] Patent Number: 4,962,152
[45] Date of Patent: Oct. 9, 1990

[54] CURABLE FILLED POLYSILOXANE COMPOSITIONS

[75] Inventor: Patrick Leempoel, Brussels, Belgium

[73] Assignee: Dow Corning S. A., Seneffe, Belgium

[21] Appl. No.: 477,394

[22] Filed: Feb. 9, 1990

[30] Foreign Application Priority Data

Feb. 22, 1989 [GB] United Kingdom ............... 8904082

[51] Int. Cl.$^5$ .............................................. C08K 3/18
[52] U.S. Cl. .................... 524/788; 524/729; 524/425
[58] Field of Search .................. 524/425, 788, 729

[56] References Cited

U.S. PATENT DOCUMENTS 4,585,821  4/1986  Progneaux et al. ............. 524/425
4,888,380  12/1989  Kamis et al. .................... 524/788

Primary Examiner—Melvyn I. Marquis
Assistant Examiner—Karen A. Hellender
Attorney, Agent, or Firm—Roger H. Borrousch

[57] ABSTRACT

The specification describes and claims curable polysiloxane compositions filled with a mixture of two types of finely divided calcium carbonate. The curable polysiloxane comprises 100 parts by weight of a hydroxypolysiloxane with from 5 to 12 parts by weight of a curing agent therefore comprising a silane of the formula $R_aR'_bSi$ or a siloxane having units

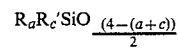

wherein each R represents a monovalent hydrocarbon group, each R' represents an hydroxy, alkoxy, or alkoxyalkoxy group, $a+b=4$, a has a value 0 or 1, b has a value 3 or 4, c has a value 1, 2 or 3 and $a+c$ is not greater than 3 as exemplified by methyl trimethoxy silane, together with a catalytic amount of a titanium or tin compound for promoting curing of the product in presence of moisture of the atmosphere. The composition contains, per 100 parts by weight of the polysiloxane, from 50 to 200 parts by weight of a filler comprising a mixture of 10 to 80% by weight of the mixture of a calcium carbonate composed principally of particles having a surface area from 10 m$^2$/g to 30 m$^2$/g and 20 to 90% by weight of the mixture of a calcium carbonate composed principally of particles having a surface area from 0.5 m$^2$/g to 12 m$^2$/g. The compositions are applicable as sealant compositions having a desirable blend of properties including adhesion to various surfaces.

15 Claims, No Drawings

CURABLE FILLED POLYSILOXANE COMPOSITIONS

This invention is concerned with improvements in or relating to curable, filled polysiloxane compositions.

Curable polysiloxane compositions find use in various applications for example, as sealant compositions which can be applied to a joint between elements and cured to provide an elastomeric seal between them. Those compositions which cure at room temperature upon exposure to atmospheric moisture are particularly attractive for use as sealant compositions for sealing for example, highway joints, joints in articles for example vehicle headlights, joints in buildings and in glazing applications, in view of the fact that no special heating or other cure conditions are generally required to produce a seal of desired quality.

Compositions intended for use as sealant compositions are required to have a combination of properties. For example they should be capable of extrusion at an acceptable rate to flow into contact with surfaces of the joint, and of curing at an acceptable rate at ambient or elevated temperatures, to provide a cured mass at least lightly adherent to the surfaces of the joint, which mass has desired elastomeric properties as evidenced by modulus at 100% elongation, elongation at break and tensile strength. The flow characteristics which are required depend on the intended use of the composition. For example those compositions intended for application to vertically extending joints, such as occur in architectural applications, require the ability to flow into proper contact with the surfaces of the joint but to remain in place without further flow whilst curing occurs. The effectiveness of the seal in its chosen location is principally dependent on its elastomeric properties and the good adherence of the seal to the surfaces of the joint.

Elastomeric properties of the seal are governed at least in part by the formulation of the sealant composition and are influenced by the type and proportion of filler present in the composition. Inclusion of larger quantities of filler is desirable for economic reasons but heretofore has been limited by performance considerations. Fillers frequently employed in room temperature curable silicone sealants include precipitated and fumed silicas, clays and finely divided basic materials, for example, carbonates as exemplified by precipitated and ground calcium carbonates. The calcium carbonates may be surface treated, for example stearate coated, or not. Of these materials, the silicas are frequently used in practice. The carbonates are also used, the surface treated materials being preferred. The use of larger proportions of carbonate filler (i.e. more than about 25% by weight of the composition) tends to lead to cured products of greater hardness and higher modulus. The use of silica fillers tends to lead to cured sealants which are highly crosslinked and which have a comparatively high modulus. The silica fillers are generally used in amounts of less than about 15% by weight of the composition. Whilst the inclusion of fillers has some benefits, the cured compositions which include significant amounts of filler thus tend to have a modulus at 100% elongation property which is higher than desired for many sealant applications.

Inclusion of the larger proportions of certain silicas and carbonates in silicone sealant compositions dramatically reduces flowability of the composition, which is reflected in extrusion characteristics and flow properties when inserted in a joint. The filler employed and the proportion used also influences adhesion characteristics of the composition. Materials commonly encountered in the building and glazing industries include concrete, mortar, glass, tile, aluminium, and plastics materials for example, unplasticised polyvinyl-chloride. There are numerous materials described as concrete or mortar; they are generally alkaline materials the particular characteristics of which are dependent upon the raw materials from which they are made. There are two types of concrete referred to hereinafter by way of examples of the various materials available, one being a smooth surfaced material made according to a German standard specification (hereinafter "DIN concrete") and one being a rough surfaced material made according to a French Standard specification (hereinafter "SNJF concrete"). Adhesion of silicone sealants to Din concrete is generally more difficult to achieve than adhesion to SNJF concrete.

Room temperature curable silicone sealants frequently demonstrate adequate adhesion to glass, aluminium and polyvinyl chloride, but their adhesion to porous substrates, for example concrete and mortar, is frequently less than desired and frequently degenerates upon prolonged exposure to water. For example we have found that silicone sealants incorporating precipitated calcium carbonates show poorer adhesion to concrete than similar sealants employing ground calcium carbonates. However, the use of substantial quantities of ground calcium carbonate leads to a high degree of flowability of the composition such as is unacceptable for a building sealant. Adhesion properties of silicone sealants are generally augmented when necessary by inclusion of adhesion promoters, for example amino alkoxy silanes, in the composition or by use of primers on the surfaces to be sealed. It is a practice to apply a film forming primer to these porous substrates and allow it to dry prior to application of a silicone sealant in order to achieve the desired level of adhesion, but this practice is undesirable in view of the labour necessary to produce consistent high quality results and in view of the period of time required to carry out the priming operation.

Thus it is not a simple matter to provide a highly filled curable silicone composition having a combination of properties including a medium modulus (i.e. 0.7 MPa or less) or low modulus (i.e. 0.4 or less) at 100% elongation, high elongation at break and good tensile properties coupled with a good adhesion under dry and wet conditions to, for example concrete, aluminium, glass and unplasticised polyvinylchloride.

It is a practice when formulating moisture curable silicone compositions which use higher proportions of filler to incorporate into the composition a plasticiser, for example a non-reactive silicone fluid or gum, for example a trialkylsilyl end-blocked polydiorganosiloxane, or an organic diluent, for example an aromatic petroleum hydrocarbon e.g. petroleum naphtha or a polyether. These materials influence various properties of the composition, for example modulus and adhesive properties. The plasticisers employed are generally not retained in the formulation for the life of the seal and may result in staining on the surface of the seal and some reduction of the elastomeric and adhesion properties over a long period of time. Whilst this is acceptable in some applications, there are applications in which this is undesirable.

It is one of the objects of the present invention to provide a curable filled silicone composition which is capable of cure under the influence of moisture to provide a cured mass having an improved blend of properties.

We have found that one may provide a moisture curable silicone composition having an improved combination of modulus and adhesion characteristics by incorporating into certain silicone compositions a blend of selected fillers having different surface areas.

We have also found that one may formulate a silicone composition having not only acceptable adhesion characteristics but also improved non-staining characteristics by incorporating into certain silicone compositions a blend of selected fillers of different surface areas.

The present invention provides in one of its aspects a curable composition comprising (A) the product formed by mixing 100 parts by weight of a hydroxypolysiloxane with from 5 to 12 parts by weight of a curing agent therefore comprising a silane of the formula $R_aR'_bSi$ or a siloxane having units $$R_aR_c'SiO_{\frac{(4-(a+c))}{2}}$$

wherein each R represents a monovalent hydrocarbon group, each R' represents an hydroxy, alkoxy, or alkoxyalkoxy group, $a+b = 4$, a has a value 0 or 1, b has a value 3 or 4, c has a value 1, 2 or 3 and $a+c$ is not greater than 3, (B) from 50 to 200 parts by weight of a filler comprising a mixture of 10 to 80% by weight of the mixture of a calcium carbonate composed principally of particles having a surface area from 10 m²/g to 30 m²/g and 20 to 90% by weight calcium carbonate composed principally of particles having a surface area from 0.5 m²/g to 12 m²/g and (C) a catalytic amount of a titanium or tin compound for promoting curing of the product in presence of moisture of the atmosphere.

Hydroxypolysiloxane materials for use in a composition according to the invention may be linear or branched and may have a functionality of two or more. The polymer may include branching units according to the formula $$R_fSiO_{\frac{(4-f)}{2}}$$

wherein R is as aforesaid and f has a value of 0 or 1. α,ω dihydroxypolysiloxanes are most preferred and these may be represented by the general formula HO(R₂SiO)ₓH wherein each R represents for example, a saturated or unsaturated, substituted or unsubstituted hydrocarbon group for example an alkyl group having up to twelve carbon atoms (e.g. methyl, ethyl, propyl, vinyl or allyl) or an aromatic group (e.g. phenyl) and x is an integer which may be, for example, such that the polymer has a viscosity in the range 50 to 500,000 mm²/s. The hydroxy polysiloxanes are well known materials and may be made by procedures well known in the art. Usually they are made by the addition of diorganodichlorosilanes to a water/solvent mixture to yield a mixture of low molecular weight hydroxy endblocked oligomers and cyclic siloxanes in solvent. Linear α,ω dihydroxy polysiloxane polymers of desired molecular weight may be manufactured from the low molecular weight linear α,ω dihydroxy polydiorganosiloxane oligomers, (produced as aforesaid or by a process involving ring opening of the cyclic materials referred to) by way of condensation and equilibration in presence of a basic or an acidic catalyst. In preferred materials at least 85% and preferably all of the R groups are methyl.

These polymers may be formulated into a curable composition by admixture with a curing agent therefore, which comprises a silane of the formula $R_aR'_bSi$ or a siloxane having units $$R_aR_c'SiO_{\frac{(4-(a+c))}{2}}$$

wherein each R represents a monovalent hydrocarbon group, each $R^{40}$ represents an hydroxy, alkoxy or alkoxyalkoxy, $a+b=4$, a has a value 0 or 1, b has a value 3 or 4, c has a value 1, 2 or 3, and $a+c$ is not greater than 3 to form a mixture and/or compound containing silicon-bonded groups which are reactive with or become reactive with (e.g. under influence of atmospheric moisture) the silicon-bonded hydroxyl groups of the polysiloxane. Curing agents which may be used for example, include the known trifunctional and tetrafunctional moisture vapour activated crosslinkers which employ alkoxy or alkoxyalkoxy substituted silanes (as exemplified by methyltrimethoxy silane and phenyltrimethoxysilane).

in a composition

Catalysts which may be employed according to the present invention for promoting crosslinking of the hydroxypolysiloxane include the known tin and titanium compound catalysts. Suitable tin compounds include tin salts of carboxylic acids and particularly the stannous salts of the more commonly available carboxylic acids. Examples of suitable materials are dibutyl tin dilaurate, stannous acetate, stannous napthenate, stannous benzoate, stannous sebacate, stannous succinate and stannous octoate. Suitable titanium compounds include certain alkyl titanates and alkyltitanium complexes, for example tetraisobutyl titanate, tetraisopropyl titanate and di(isopropyl) - di(ethylacetoacetate) titanate.

Fillers which may be used in a composition according to the invention include the commercially available calcium carbonates (which may include minor proportions of, for example, magnesium carbonate) and mixtures thereof. Those which have been surface treated by, for example, treatment of the filler to provide up to about 5% of an aliphatic, araliphatic or other acid salt, by use of, for example stearic acid or dodecylbenzene sulphonic acid, may be used. No special pretreatment of the filler materials is necessary and they may be used as received, whether treated or not. Preferred materials are those which contain from about 0.4 to about 3.0% by weight stearate. The commonly used commercially available precipitated calcium carbonates generally are crystalline and have a substantially uniform particle size such that their surface area is in the range of about 20 to about 24 m²/g whereas the commonly used commercially available ground calcium carbonates may be crystalline or amorphous materials each grade of which contains a fairly wide spread of particle sizes and is composed principally of particles having a surface area in the range of about 1 to about 12 m²/g, although other particle size materials are available.

One may employ ground calcium carbonates to provide each of the two calcium carbonates in the mixture. However, compositions formed with solely ground calcium carbonate as filler are generally too highly flowable to be satisfactory for use as sealants in, for example, joints in walls. The precipitated calcium carbonates contribute to non-flow properties of sealant compositions. We prefer to employ the precipitated materials to provide the calcium carbonate having a surface area from 10 m$^2$/g to 30 m$^2$/g and to employ the ground materials to provide the calcium carbonate composed principally of particles having a surface area from 0.5 m$^2$/g to 12 m$^2$/g. The filler comprising a mixture of calcium carbonates is present to an extent of from 50 to 200 parts by weight per 100 parts of the hydroxypolysiloxane. The smaller proportions of filler may be employed in products which are required to be readily flowable. Those compositions which employ a major proportion of the preferred calcium carbonate composed principally of particles having a surface area from 10, preferably from 15 m$^2$/g to 30 m$^2$/g (hereinafter referred to as the principal filler) tend to be less flowable than those which employ a major proportion of the calcium carbonate composed principally of particles having a surface area from 0.5 m$^2$/g to 12 m$^2$/g (hereinafter referred to as the secondary filler). The principal filler is employed in proportions of at least 10% and preferably at least 20% by weight, and less than 80%, preferably not more than about 60% to 70% by weight of the mixed filler. Compositions having the smaller proportions of the principal filler demonstrate more adequate adhesion to SNJF concrete, whereas compositions having substantially larger proportions of the principal filler tend to be less flowable prior to curing and to cure to elastomers of rather high modulus. The secondary filler is employed in proportions of 20% to 90% of the mixed principal and secondary fillers and may provide at least 60% by weight of the mixed filler. Compositions having larger proportions of the secondary filler, and especially those secondary fillers having the lowest surface areas, demonstrate good flow in the uncured state and enhanced adhesion to concrete, particularly to DIN concrete. They also tend to cure to elastomers which are rather weak and have low tensile strength and modulus at 100% elongation. In order to secure a desired blend of tensile strength with comparatively low modulus coupled with acceptable adhesion to concrete, both SNJF and DIN, as well as glass, aluminium and unplasticised polyvinylchloride one may employ 20 to 30% of the principal filler and 70 to 80% of the secondary filler. Those compositions in which the ratio of principal filler to secondary filler is of the order of 1:3 are comparatively free flowing compositions prior to curing and if non-slump properties are required it is necessary to include in the composition a flow control agent. Those compositions in which the ratio of principal filler to secondary filler is greater than 3:1 tend to be too stiff for ease of application as sealant compositions but those in which the ratio is less than 3:1, e.g. those in which the ratio is of the order of about 2:1, demonstrate a more acceptable rheology for those sealants which require non-slump properties. For sealant compositions intended to have low slump properties and intended to cure to provide seals having a low, medium or high modulus of elasticity, we prefer to employ a major Proportion of the principal filler in the mixture and to employ from 100 to 175 parts of the mixture of carbonates per 100 parts by weight of the hydroxypolysiloxane. In order to secure a desired blend of flow without slump of the uncured composition, together with suitable tensile strength and modulus and adhesion to concrete, glass, aluminium and unplasticised polyvinylchloride, we prefer to employ a mixture of 60 to 70% by weight of the principal filler and 30 to 40% of secondary filler, i.e. a ratio by weight of about 2:1. We prefer that the principal filler has a surface area of about 20 to 24 m$^2$/g and that the secondary filler has a surface area of less than 3 m$^2$/g. A composition according to the present invention may contain from 20 to 60% of the combined fillers. In general, an increase in the proportion of the mixed filler incorporated into the composition renders the composition less readily flowable and leads to lower adhesion values and also an increase in the modulus at 100% extension of the cured composition. Nevertheless, we have found it possible to provide compositions which contain at least 35% e.g. 40 to 55% by weight of the selected mixed filler and have a desirable blend of flow, adhesion and elastomeric properties suitable for use as a room temperature curable sealant composition, capable of use even on the difficult to bond DIN concrete.

The fillers specified are preferably used as the sole filler. Additional fillers, for example ferric oxide, diatomaceous earth, alumina, hydrated alumina, titanium oxide, glass microballoons, organic fillers or resins, crushed quartz, calcium sulphate, oxides, hydroxides carbonates or bicarbonates of calcium, magnesium, barium or zinc, barium sulphate and fumed silicas, or mixtures thereof, may be included but properties of the compositions are not generally enhanced by their inclusion. An exception is the possible inclusion of minor amounts of selected silicas which influence rheology of the compositions.

A composition according to the present invention may contain a liquid plasticiser or extender. One may employ for example a non-reactive silicone fluid or gum, for example a trialkylsilyl end blocked polydiorganosiloxane, or an organic diluent. The trialkylsilyl end-blocked polydimethyl siloxanes are preferred, especially those having a viscosity in the range of about 100 mm$^2$/s to about 15,000 mm$^2$/s. These materials are beneficial in reducing modulus at 100% elongation and also contribute to ability of the composition to adhere to concrete. However, in view of their tendency to exude from the composition over long periods of time we prefer to employ them only in those cases where this exudation is acceptable. In such cases we prefer to employ the trialkylsilyl end-blocked polydimethyl siloxanes to provide up to about 40%, more preferably up to 25% by weight of the composition.

One may also include in a composition according to the invention other additives, for example flow modifiers, for example carboxylated polybutadienes and derivatives of alkylarylsulphonic acids and additives frequently employed in silicone sealants, for example pigments, antioxidants and adhesion promoters, for example hydrolysable amino silanes, for example γ-aminopropyl-trimethoxysilane, N-β-aminoethyl-γ-aminopropyl-triethoxysilane and glycidoxypropyltrimethoxysilane.

A composition according to the invention, which may be a one or two part composition, may be prepared by mixing the ingredients together in any desired order. For example preferred one part, moisture curable compositions may be made by mixing together the principal and secondary fillers, dispersing the mixed filler in the hydroxy polydiorganosiloxane, or by adding the fillers separately to the hydroxy polydiorganosiloxane and then adding the catalyst and curing agent. It is necessary to remove excess water from the mixture before the crosslinking agent is added, although minor excess amounts may be scavenged during storage by use of suitable quantities of hydrolysable silanes. Pigments and minor additives may be added to the mixture at any desired stage, and this is preferably done as near the end of the mixing procedure as possible. The composition may then be charged into and left to age for 7 days or more at room before use.

A composition according to the invention may be formulated which has a desired blend of properties which render it suitable for use as a sealant various purposes, for example making insulating glazing units, glazing, expansion joints, or as a general purpose sealant. A particular benefit is the possibility to formulate a composition which demonstrates a good adhesion to concrete without the need to employ a primer coating on the concrete, which adhesion is not unduly weakened by prolonged immersion in water.

The invention provides in another of its aspects a composition packaged as a one part sealant and comprising (A) the product formed by mixing 100 parts by weight of a dihydroxypolysiloxane of the general formula $HO(R_2SiO)_xH$ wherein each R represents a saturated or unsaturated, substituted or unsubstituted hydrocarbo group which is an alkyl group having up to twelve carbon atoms or an aromatic group and x is an integer such that the polymer has a viscosity in the range 50 to 500,000 $mm^2/s$, (B) from 5 to 12 parts by weight of a trifunctional alkoxy, or alkoxyalkoxy substituted silane, (C) from 70 to 175 parts by weight of a filler comprising a mixture of a calcium carbonate composed principally of particles having a surface area from 15 $m^2/g$ to 30 $m^2/g$ and a calcium carbonate composed principally of particles having a surface area from 0.5 $m^2/g$ to 12 $m^2/g$, the calcium carbonates being present in a ratio by weight in the range 1:3 to 3:1, and (D) a catalytic amount of a titanium compound for promoting curing of the product in presence of moisture of the atmosphere.

In order that the invention may become more clear, there follows a description of example compositions, of which all except Example compositions 1, 6, 10 and 34 are illustrative of the present invention. In the Examples, all parts are expressed by weight unless otherwise specified.

In the Examples, the fillers used as principal and secondary fillers were as follows.

Principal filler types, all being precipitated calcium carbonate products:

Filler 1 was Socal $U_1S_2$ supplied by Solvay and Co., Brussels, Belgium,

Filler 2 was Socal $U_1S_2$ supplied by Solvay and Co.,

Filler 3 was Winnofil SPM supplied by ICI, Runcorn, U.K.

Filler 4 was Calofort S supplied by J. E. Sturge Ltd., Birmingham, U.K.

Secondary filler types, all being ground calcium carbonate products:

Filler 5 was BLR3 supplied by Omya-Plus Stauffer AG, Oftringen, Switzerland,

Filler 6 was Mikrodohl AH supplied by Norwegian Talc, Bergen, Switzerland, and comprised 70% calcium carbonate and 30% magnesium carbonate Filler 7 was Polycarb 60S supplied by English China Clay International, St. Austell, U.K.

Filler 8 was Polycarb SB supplied by English China Clay International.

Filler 9 was Polycarb S supplied by English China Clay International.

Filler 10 was Hydrocarb 95T supplied by Omya-Plus-Stauffer AG, and

Filler 11 was Carbital 90S supplied by English China Clay International.

Characteristics of these fillers are as follows:

| Filler | Surface Area $m^2/g$ | Stearate Content % |
| --- | --- | --- |
| 1 | 20 | 2.4 |
| 2 | 20 | 3.0 |
| 3 | 22 | 2.8 |
| 4 | 24 | 3.0 |
| 5 | 1–2 | 0.4 |
| 6 | 2 | 0.9 |
| 7 | 4–6 | 1.1 |
| 8 | 8 | 0.9 |
| 9 | 8 | 0.9 |
| 10 | 12 | 1.1 |
| 11 | 12 | 1.0 |

Various example compositions were prepared from ingredients as set forth in the following Examples 1 to 8. In each case a base formulation was prepared in a planetary type mixer. The fillers were mixed together and then dispersed in hydroxyl end-blocked polydimethylsiloxane polymer before addition of any trimethylsilyl end-blocked polydimethylsiloxane used. The hydroxyl end-blocked polydimethylsiloxane polymer used had a viscosity of about 50,000 $mm^2/s$ at 25° C. and an hydroxyl content of 0.057 weight percent. The base composition was then vacuum stripped before the addition of methyl trimethoxy silane as curing agent, di(isopropyl)-di(ethylacetoacetate) titanate as titanium compound catalyst and small amounts of N-βaminoethyl-γ-aminopropyl-trimethoxy silane as adhesion promoter for non-porous surfaces.

The compositions were tested as follows. After 7 days room temperature aging in the cartridge, the composition was extruded from its cartridge onto a flat surface to provide a 2mm thick layer. This was allowed to cure for 7 days at 23° C. and 50% relative humidity to provide a cured sheet. Dumbbells were then cut from the aged sheets and elongated to rupture on a Zwick 1445 extensiometer. Tensile strength (in MPa), modulus at 100% elongation (in MPa) and elongation at break (as a percentage of original length) were measured and recorded.

Adhesion of the compositions was tested in the following way. Test samples were made by applying a bead of each composition onto the surface of a prepared test slab of SNJF or DIN concrete or a prepared strip of glass, unplasticized PVC, mill-finished aluminum panel or polycarbonate. The SNJF concrete slabs were according to CPA 55 made according to NFP15-301 and the DIN concrete samples were according to DIN 1164 page 7 using cement of class 350. The concrete slabs were prepared for application of the compositions by brushing with a wire brush and blown with compressed air, then left to equilibrate as 23±2 C. and 50±5% RH at least 1 hour before use. The other test strips were prepared by cleaning the strips of glass and aluminium panels with acetone and the unplasticised PVC with a mixture of 60 parts isopropanol and 40 parts acetone and allowing them to dry for 15 minutes before application of the composition thereto. The polycarbonate strips were not cleaned prior to application of the composition thereto. The time in minutes which elapsed between application of the bead to the substrate and development of a non-tacky surface on the bead was noted as the tack-free time. The test samples were tested according to the following three test sequence (a) cure period of 7 days at room temperature on the substrate prior to test followed by (b) 2 days immersion in water prior to test followed by (c) 2 days immersion in water at 50° C. prior to test.

The adhesion test was performed by undercutting the sealant bead at one edge of the slab or strip using a knife, then pulling the bead first upward then at 90 degrees to develop tensile and peel forces. After each test a rating was given to the sample: 0=interfacial failure 1=boundary failure 2=cohesive failure. The final rating recorded in the Tables below is the average rating obtained for all three tests of the sequence and ranges from 0 (no adhesion throughout the test) to 2 (excellent adhesion throughout the test).

EXAMPLE 1

Example compositions 1 to 6 were prepared by mixing to homogeneity 90 parts of the hydroxyl endblocked polydimethylsiloxane polymer, 150 parts of a filler made from Fillers 1 and/or 5, and 50 parts of trimethylsilyl endblocked polydimethylsiloxane polymer having a viscosity of about 100 mm²/s at 25° C. To this mixture was added 8 parts of the curing agent, 2.5 parts of the titanate catalyst and 0.2 part of the adhesion promoter. Results of the tests are shown in Table 1.

TABLE 1

| Filler content | Example Composition | | | | | |
|---|---|---|---|---|---|---|
| | 1 | 2 | 3 | 4 | 5 | 6 |
| Filler 1 | 0 | 37.5 | 56.3 | 93.7 | 112.5 | 150 |
| Filler 5 | 150 | 112.5 | 93.7 | 56.3 | 37.5 | 0 |
| Tack Free Time | 135 | 34 | 69 | 19 | 53 | 38 |
| Tensile Strength | 0.46 | 1.25 | 1.30 | 1.80 | 1.80 | 1.90 |
| Elongation | 408 | 533 | 424 | 544 | 457 | 473 |
| Modulus 100% | 0.25 | 0.45 | 0.53 | 0.57 | 0.65 | 0.68 |
| Adhesion to Glass | 2.00 | 2.00 | 2.00 | 2.00 | 2.00 | 2.00 |
| Aluminium | 2.00 | 2.00 | 1.67 | 2.00 | 2.00 | 2.00 |
| UPVC | 2.00 | 2.00 | 2.00 | 2.00 | 2.00 | 2.00 |
| Concrete (SNJF) | 1.67 | 1.67 | 1.33 | 0.33 | 0.67 | 0.00 |
| Concrete (DIN) | 1.33 | 2.00 | 2.00 | 0.67 | 1.00 | 0.00 |

As can be seen from the results given in Table 1 an increase in the proportion of high surface area filler (Filler 1) and a corresponding decrease in the proportion of low surface area filler (Filler 5) leads in general to increased elastomeric properties (increased tensile strength, elongation at break, modulus at 100%) and a variation in the adhesion to concrete. The optimum combination of low modulus at 100% elongation and adhesion properties is shown by Example composition 2 wherein the ratio of Filler 1 to Filler 5 is 1:3 by weight.

EXAMPLE 2

Example compositions 7 to 10 were prepared by mixing to homogeneity 100 parts of the hydroxyl endblocked polydimethylsiloxane polymer, 100 parts of a filler made from Fillers 2 and 5, 10.5 parts of the curing agent, 2.5 parts of the titanate catalyst and 0.5 part of the adhesion promoter. The test results are shown in Table 2.

TABLE 2

| | Example Composition | | | |
|---|---|---|---|---|
| | 7 | 8 | 9 | 10 |
| Filler 2 | 25 | 50 | 75 | 100 |
| Filler 5 | 75 | 50 | 25 | 0 |
| Tack Free Time | 100 | 66 | 62 | 49 |
| Tensile Strength | 1.47 | 2.14 | 2.62 | 2.78 |
| Elongation | 575 | 595 | 680 | 576 |
| Modulus 100% | 0.55 | 0.70 | 0.88 | 0.97 |
| Adhesion to Glass | 2.00 | 2.00 | 2.00 | 1.00 |
| Aluminium | 2.00 | 2.00 | 2.00 | 1.00 |
| UPVC | 2.00 | 2.00 | 1.33 | 0.00 |
| Concrete (SNJF) | 2.00 | 2.00 | 0.33 | 0.33 |
| Concrete (DIN) | 1.00 | 1.00 | 0.33 | 0.00 |

As can be seen from the results given in Table 2, for those compositions incorporating no trimethylsilyl endblocked polydimethylsiloxane fluid as plasticiser, an increase in the proportion of high surface area filler (Filler 2) and a corresponding decrease in the proportion of low surface area filler (Filler 5) leads in general to increased elastomeric properties (increased tensile strength, elongation at break, modulus at 100%) and a variation in the adhesion to concrete. The optimum combination of medium modulus at 100% elongation and adhesion properties is shown by Example compositions 7 and 8 wherein the ratios of Filler 2 to Filler 5 are 1:3 and 1:1 respectively.

EXAMPLE 3

Example compositions 11 to 13 were prepared using the amounts of materials recited in Example 1 except that the filler employed consisted of a mixture of equal parts of Filler 5 and principal fillers as recited in Table 3. The test results are shown in Table 3.

TABLE 3

| | Example Composition | | |
|---|---|---|---|
| | 11 | 12 | 13 |
| Filler | 1 | 4 | 3 |
| Tack Free Time | 52 | 55 | 74 |
| Tensile Strength | 1.48 | 1.45 | 1.40 |
| Elongation | 317 | 542 | 532 |
| Modulus 100% | 0.75 | 0.43 | 0.38 |
| Adhesion to Glass | 2.00 | 1.67 | 2.00 |
| Aluminium | 2.00 | 2.00 | 1.33 |
| UPVC | 2.00 | 2.00 | 2.00 |
| Concrete (SNJF) | 2.00 | 2.00 | 2.00 |
| Concrete (DIN) | 1.33 | 0.00 | 0.00 |

From the results, it can be seen the compositions all demonstrate good adhesion to SNJF concrete (cf composition 6 which contains no secondary filler).

EXAMPLE 4

Example compositions 14 to 16 were prepared using the amounts of materials recited in Example 2 except that the filler employed consisted of a mixture of Filler 5 and principal fillers as recited in Table 4 in a ratio by weight of 3:1. The test results are shown in Table 4.

TABLE 4

| | Example Composition | | |
|---|---|---|---|
| | 14 | 15 | 16 |
| Filler | 2 | 3 | 4 |
| Tack Free Time | 100 | 195 | 178 |
| Tensile Strength | 1.47 | 1.50 | 1.24 |
| Elongation | 575 | 519 | 480 |
| Modulus 100% | 0.55 | 0.59 | 0.55 |
| Adhesion to Glass | 2.00 | 2.00 | 2.00 |
| Aluminium | 2.00 | 2.00 | 2.00 |

TABLE 4-continued

| | Example Composition | | |
|---|---|---|---|
| | 14 | 15 | 16 |
| UPVC | 2.00 | 2.00 | 2.00 |
| Concrete (SNJF) | 2.00 | 2.00 | 2.00 |
| Concrete (DIN) | 1.00 | 1.33 | 1.33 |

From the results, it can be seen the compositions 14, 15 and 16 all demonstrate good adhesion to SNJF concrete and adhesion to DIN concrete as well as satisfactory adhesion to glass, aluminium and unplasticised polyvinylchloride together with a modulus at 100% of less than 0.6 MPA.

EXAMPLE 5

Example compositions 17 to 20 were prepared using the amounts of materials recited in Example 2 except that as filler 70 to 100 parts of a mixture of 50% of Filler 1 and of Filler 5 was used. The test results are shown in Table 5.

TABLE 5

| | Example Composition | | | |
|---|---|---|---|---|
| | 17 | 18 | 19 | 20 |
| Filler-parts | 70 | 80 | 90 | 100 |
| Tack Free Time | 50 | 155 | 99 | 66 |
| Tensile Strength | 1.61 | 1.58 | 1.82 | 2.14 |
| Elongation | 536 | 474 | 544 | 595 |
| Modulus 100% | 0.54 | 0.53 | 0.58 | 0.7 |
| Adhesion to Glass | 2.00 | 2.00 | 2.00 | 2.00 |
| Aluminium | 2.00 | 2.00 | 2.00 | 2.00 |
| UPVC | 1.67 | 1.67 | 1.33 | 2.00 |
| Concrete (SNJF) | 2.00 | 1.67 | 2.00 | 2.00 |
| Concrete (DIN) | 1.33 | 1.33 | 1.33 | 1.00 |

Good adhesion performance was shown by the compositions even at filler contents up to almost 50% of the total formulation using the filler mixture comprising the primary and secondary fillers in a ratio by weight of 1:1

EXAMPLE 6

Example compositions 21 to 24 were made by mixing to homogeneity 150 parts of a filler made from a mixture of 25% of Filler 2 and 75% of Filler 5. Example compositions 21 and 22 were made by use of 70 parts of the hydroxyl end-blocked polydimethylsiloxane polymer and 70 parts of a trimethylsilyl end-blocked polydimethylsiloxane polymer. In example composition 21 a trimethylsilyl end-blocked polydimethylsiloxane polymer having a viscosity of 100 mm²/s was used and in example composition 22 a trimethylsilyl end-blocked polydimethylsiloxane polymer having a viscosity of 10,000 mm²/s was used. In example compositions 23 and 24, 90 parts of the hydroxyl end-blocked polydimethylsiloxane polymer used in Example 1 and 50 parts of a trimethylsilyl end-blocked polydimethylsiloxane polymer. In example composition 23 a trimethylsilyl end-blocked polydimethylsiloxane polymer having a viscosity of 100 mm²/s was used and in example composition 24 a trimethylsilyl end-blocked polydimethylsiloxane polymer having a viscosity of 10,000 mm²/s was used. Each composition contained 8 parts of the curing agent, 2.5 parts of the titanate catalyst and 0.2 part of the adhesion promoter. The test results are shown in Table 6.

TABLE 6

| | Example Composition | | | |
|---|---|---|---|---|
| | 21 | 22 | 23 | 24 |
| Tack Free Time | 155 | 104 | 123 | 110 |
| Tensile Strength | 0.83 | 0.63 | 1.01 | 1.20 |
| Elongation | 464 | 594 | 528 | 510 |
| Modulus 100% | 0.25 | 0.28 | 0.38 | 0.44 |
| Adhesion to Glass | 2.00 | 2.00 | 2.00 | 2.00 |
| Aluminium | 1.67 | 2.00 | 2.00 | 2.00 |
| UPVC | 2.00 | 2.00 | 2.00 | 2.00 |
| Concrete (SNJF) | 2.00 | 1.33 | 2.00 | 2.00 |
| Concrete (DIN) | 1.33 | 0.33 | 1.67 | 1.67 |

From Table 6 it can be seen that compositions containing this mixed filler and a trimethylsilyl end-blocked polydimethylsiloxane polymer demonstrate good adhesion properties on many substrates, including SNJF concrete and some adhesion to DIN concrete, as well as a modulus at 100% elongation of 0.44 or less. Example compositions 21, 22 and 23 showed a modulus of less than 0.4. A first companion composition was prepared from 100 parts of the hydroxypolysiloxane used in Example 1, 75 parts of Filler 2, 37.5 parts of Filler 5, 40 parts of the trimethylsilyl end-blocked polydimethylsiloxane polymer having a viscosity of 100 mm²/s, 1.25 parts of a carboxylated butadiene, 6 parts of the curing agent, .2 parts of the catalyst and 0.2 part of the adhesion promoter. A second companion composition was prepared from 100 parts of the hydroxypolysiloxane used in Example 1, 80 parts of Filler 2, 45 parts of Filler 5, 20 parts of the trimethylsilyl end-blocked polydimethylsiloxane polymer having a viscosity of 100 mm²/s, 1.03 part of dodecylbenzene sulphonic acid, 6 parts of the curing agent, 2 parts of the catalyst and 0.2 part of the adhesion promoter. When these companion compositions were tested, elastomeric seals were formed having a modulus of 0.34 and 0.39 respectively. Adhesion to glass and unplasticised polyvinylchloride was excellent with both the companion compositions. Both compositions demonstrated adhesion to aluminium, SNJF concrete and DIN concrete with the first companion composition showing the better adhesion properties. When a formulation was prepared in the same way as Example Composition 23, but using an untreated calcium carbonate which was otherwise similar to Filler 5, physical and adhesion properties were found comparable with those achieved with Example Compensation 23.

EXAMPLE 7

Example compositions 25 to 28 were prepared using the amounts of materials recited in Example 1 except that the filler employed consisted of a mixture of equal parts of Filler 1 and secondary fillers as recited in Table 7. The test results are shown in Table 7.

TABLE 7

| | Example Composition | | | |
|---|---|---|---|---|
| | 25 | 26 | 27 | 28 |
| Filler | 5 | 6 | 8 | 10 |
| Tack Free Time | 52 | 32 | 23 | 32 |
| Tensile Strength | 1.48 | 1.31 | 1.70 | 1.86 |
| Elongation | 317 | 341 | 427 | 376 |
| Modulus 100% | 0.75 | 0.54 | 0.47 | 0.60 |
| Adhesion to Glass | 2.00 | 2.00 | 2.00 | 2.00 |
| Aluminium | 2.00 | 2.00 | 2.00 | 1.67 |
| UPVC | 2.00 | 2.00 | 2.00 | 2.00 |
| Concrete (SNJF) | 2.00 | 2.00 | 0.33 | 1.33 |
| Concrete (DIN) | 1.33 | — | 0.00 | — |

From the results it can be seen that Example compositions 25 and 26 are more beneficial in relation to adhesion properties than the others, but all show more beneficial adhesion effects than Example composition 6 and a higher modulus than Example composition 1. These effects are attributed to the filler mixtures used, the differences between properties of the compositions being attributed to the particular surface areas particulate form and proportion of surface treatment of the different principal and secondary fillers employed.

EXAMPLE 8

Example compositions 29 to 33 were prepared using the amounts of materials recited in Example 2 except that the filler employed consisted of a mixture of Filler 1 and secondary fillers as recited in Table 8 in a proportion by weight of 1:3. The test results are shown in Table 8.

TABLE 8

| | Example Composition | | | | |
|---|---|---|---|---|---|
| | 29 | 30 | 31 | 32 | 33 |
| Filler | 5 | 6 | 7 | 9 | 11 |
| Tack Free Time | 100 | 74 | 33 | 77 | 30 |
| Tensile Strength | 1.47 | 1.41 | 2.19 | 2.54 | 2.90 |
| Elongation | 575 | 404 | 342 | 355 | 319 |
| Modulus 100% | 0.55 | 0.58 | 0.69 | 0.87 | 0.91 |
| Adhesion to Glass | 2.00 | 2.00 | 2.00 | 2.00 | 2.00 |
| Aluminium | 2.00 | 2.00 | 2.00 | 1.33 | 1.67 |
| UPVC | 2.00 | 2.00 | 0.00 | 2.00 | 2.00 |
| Concrete (SNJF) | 2.00 | 2.00 | 2.00 | 1.33 | 2.00 |
| Concrete (DIN) | 1.00 | 0.67 | 0.00 | 0.67 | 0.67 |

From the results it can be seen that Example compositions 29, 30 and 33 are more beneficial in relation to adhesion properties than the others, but all show more beneficial adhesion effects than Example composition 6 and a higher modulus than Example composition 1. These effects are attributed to the filler mixtures used, the differences between properties of the compositions being attributed to the particular surface areas, particulate form and proportion of surface treatment of the different principal and secondary fillers employed.

EXAMPLE 9

Example compositions 34 to 40 were prepared in a similar manner to compositions 1 to 33. Filler mixtures as indicated in Tables 9a and 9b were prepared and then 100 parts of each filler mixture was dispersed in 100 parts hydroxyl end-blocked polydimethylsiloxane having a viscosity of about 12,500 mm²/s and 3 parts of a hydroxyl end-blocked polydimethylsiloxane having a viscosity of about 40 mm²/s. This composition was vacuum stripped and a mixture of 1.8 parts of methyl trimethoxysilane as curing agent, 0.86 part aminopropyltrimethoxysilane, 6.6 parts of a trimethylsilyl end-blocked polydimethylsiloxane having a viscosity of about 10,000 mm²/s, dibutyltin dilaurate catalyst and 0.2 part silica added. The compositions were tested as set out above. The results are shown in Tables 9a and 9b.

TABLE 9a

| | Example Composition | | | |
|---|---|---|---|---|
| | 34 | 35 | 36 | 37 |
| Filler 4 (%) | 100 | 75 | 50 | 50 |
| Filler 5 (%) | | 25 | 50 | |
| Filler 6 (%) | | | | 50 |
| Filler 7 (%) | | | | |
| Filler 9 (%) | | | | |

TABLE 9a-continued

| | Example Composition | | | |
|---|---|---|---|---|
| | 34 | 35 | 36 | 37 |
| Filler 10 (%) | | | | |
| Tack Free Time | 28 | 26 | 52 | 36 |
| Tensile Strength | 1.44 | 1.12 | 1.05 | 0.89 |
| Elongation | 174 | 178 | 246 | 169 |
| Modulus 100% | 0.86 | 0.71 | 0.56 | 0.58 |
| Adhesion to Glass | 1.33 | 2.00 | 2.00 | 2.00 |
| Aluminium | 1.33 | 2.00 | 2.00 | 2.00 |
| UPVC | 1.33 | 2.00 | 2.00 | 2.00 |
| Polycarbonate | 1.33 | 1.33 | 2.00 | 2.00 |
| Concrete (SNJF) | 0.00 | 2.00 | 2.00 | 2.00 |
| Concrete (DIN) | 1.00 | 2.00 | 2.00 | 2.00 |

TABLE 9b

| | Example composition | | |
|---|---|---|---|
| | 38 | 39 | 40 |
| Filler 4 (%) | 50 | 50 | 50 |
| Filler 5 (%) | | | |
| Filler 6 (%) | | | |
| Filler 7 (%) | 50 | | |
| Filler 9 (%) | | 50 | |
| Filler 10 (%) | | | 50 |
| Tack Free Time | 35 | 33 | 17 |
| Tensile Strength | 1.22 | 1.29 | 1.17 |
| Elongation | 180 | 199 | 196 |
| Modulus 100% | 0.64 | 0.64 | 0.60 |
| Adhesion to Glass | 2.00 | 2.00 | 2.00 |
| Aluminium | 2.00 | 2.00 | 2.00 |
| UPVC | 2.00 | 2.00 | 1.33 |
| Polycarbonate | 2.00 | 2.00 | 2.00 |
| Concrete (SNJF) | 2.00 | 2.00 | 0.67 |
| Concrete (DIN) | 1.33 | 1.33 | 1.33 |

From the results it can be seen that Example compositions 35, 36, 37, 38 and 39 are more beneficial in relation to adhesion properties than the others, but all show more beneficial adhesion effects than Example composition 34. These effects are attributed to the filler mixtures used, the differences between properties of the compositions being attributed to the particular surface areas and proportion of surface treatments of the different secondary fillers employed. Those compositions containing larger proportions of the secondary filler demonstrate lower modulus values and lower tensile strength.

That which is claimed is:

1. A curable composition (A) the product formed by mixing 100 parts by weight of a hydroxypolysiloxane with from 5 to 12 parts by weight of a curing agent therefore comprising a silane of the formula $R_aR'_bSi$ or a siloxane having units $$R_aR_c'SiO_{\frac{(4-(a+c))}{2}}$$

wherein each R represents a monovalent hydrocarbon group, each R' represents an hydroxy, alkoxy, or alkoxyalkoxy group, a+b=4, a has a value 0 or 1, b has a value 3 or 4, c has a value 1, 2 or 3 and a+c is not greater than 3, (B) from 50 to 200 parts by weight of a filler comprising a mixture of 10 to 80% by weight of the mixture of a calcium carbonate composed principally of particles having a surface area from 10 m²/g to 30 m²/g and 20 to 90% by weight of the mixture of a calcium carbonate composed principally of particles having a surface area from 0.5 m²/g to 12 m²/g and (C) a catalytic amount of a titanium or tin compound for promoting curing of the product in presence of moisture of the atmosphere.

2. A composition according to claim 1 wherein the ratio by weight of the calcium carbonate composed principally of particles having a surface area from 10 m²/g to 30 m²/g to the calcium carbonate composed principally of particles having a surface area from 0.5 m²/g to 12 m²/g is in the range 1:3 to 3:1.

3. A composition according to claim 2 wherein the calcium carbonate composed principally of particles having a surface area from 10 m²/g to 30 m²/g and the calcium carbonate composed principally of particles having a surface area from 0.5 m²/g to 12 m²/g are present in a ratio by weight of 2:1.

4. A composition according to claim 1 wherein the calcium carbonate composed principally of particles having a surface area from 10 m²/g to 30 m²/g provides from 20 to 60% by weight of the mixture of calcium carbonates.

5. A composition according to claim 1 wherein the calcium carbonate composed principally of particles having a surface area from 10 m²/g to 30 m²/g has a surface area from 20 m²/g to 24 m²/g.

6. A composition according to claim 1 wherein the calcium carbonate composed principally of particles having a surface area from 10 m²/g to 30 m²/g is a precipitated material and wherein the calcium carbonate composed principally of particles having a surface area from 0.5 m²/g to 12 m²/g is a ground material.

7. A composition according to claim 1 wherein the mixed calcium carbonate filler provides from 20 to 60% by weight of the composition.

8. A composition according to claim 7 wherein the mixed calcium carbonate filler provides from 40 to 55% by weight of the composition.

9. A composition according to claim 1 wherein the hydroxypolysiloxane comprises an α,ω dihydroxypolysiloxane of the general formula HO(R$_2$SiO)$_x$H wherein each R represents a saturated or unsaturated, substituted or unsubstituted hydrocarbon group and x is an integer such that the polymer has a viscosity in the range 50 to 500,000 mm²/s.

10. A composition according to claim 9 wherein at least 85% of the groups R are methyl groups.

11. A composition according to claim 1 wherein the curing agent comprises methyltrimethoxysilane.

12. A composition according to claim 1 wherein the catalyst comprises di(isopropyl)-di(ethylacetoacetate) titanate.

13. A composition according to claim 1 comprising up to 40% by weight of a liquid plasticiser.

14. A composition according to claim 13 wherein the plasticiser comprises a trialkylsilyl end-blocked polydimethylsiloxane having a viscosity in the range 100 mm²/s to 15,000 mm²/s and provides up to 25% by weight of the composition.

15. A composition according to claim 1 packaged as a one part sealant and comprising (A) the product formed by mixing 100 parts by weight of a dihydroxypolysiloxane of the general formula HO(R$_2$SiO)$_x$H wherein each R represents a saturated or unsaturated, substituted or unsubstituted hydrocarbon group and x is an integer such that the polymer has a viscosity in the range 50 to 500,000 mm²/s, (B) from 5 to 12 parts by weight of a trifunctional alkoxy, or alkoxyalkoxy substituted silane, (C) from 70 to 175 parts by weight of a filler comprising a mixture of a calcium carbonate composed principally of particles having a surface area from 15 m²/g to 30 m²/g and a calcium carbonate composed principally of particles having a surface area from 0.5 m²/g to 12 m²/g, the calcium carbonates being present in a ratio by weight in the range 1:3 to 3:1, and (D) a catalytic amount of a titanium compound for promoting curing of the product in presence of moisture of the atmosphere.

* * * * *